US010701006B2

(12) United States Patent
Leminen et al.

(10) Patent No.: US 10,701,006 B2
(45) Date of Patent: Jun. 30, 2020

(54) METHOD AND SYSTEM FOR FACILITATING COMPUTER-GENERATED COMMUNICATION WITH USER

(71) Applicant: VoiceCTRL Oy, Espoo (FI)

(72) Inventors: Jari Leminen, Tuusula (FI); Jukka Lähdeoja, Vantaa (FI); Erkki Heilakka, Helsinki (FI); Jan-Erik Nyrövaara, Espoo (FI)

(73) Assignee: VoiceCTRL Oy, Espoo (FI)

( * ) Notice: Subject to any disclaimer, the term of this patent is extended or adjusted under 35 U.S.C. 154(b) by 129 days.

(21) Appl. No.: 16/113,143

(22) Filed: Aug. 27, 2018

(65) Prior Publication Data
US 2020/0067855 A1 Feb. 27, 2020

(51) Int. Cl.
*H04L 12/58* (2006.01)
*G06Q 30/00* (2012.01)
*H04L 29/06* (2006.01)
*H04L 29/08* (2006.01)

(52) U.S. Cl.
CPC ......... *H04L 51/046* (2013.01); *G06Q 30/016* (2013.01); *H04L 65/1069* (2013.01); *H04L 67/22* (2013.01); *H04L 67/306* (2013.01)

(58) Field of Classification Search
CPC ... H04L 51/046; H04L 65/1069; H04L 67/22; H04L 67/306; G06Q 30/016; G06Q 30/0281; G06Q 10/101; H04M 3/51; H04M 3/5166; H04M 2203/2088; H04M 3/5231
See application file for complete search history.

(56) References Cited

U.S. PATENT DOCUMENTS

| | | | | |
|---|---|---|---|---|
| 2006/0126803 A1* | 6/2006 | Patel | ................... | H04M 3/5166 379/88.01 |
| 2007/0208858 A1* | 9/2007 | Ra | .......................... | G06Q 10/06 709/227 |
| 2009/0202056 A1* | 8/2009 | Raghav | ................... | H04M 3/58 379/142.04 |
| 2010/0091970 A1* | 4/2010 | Cheung | ............. | H04M 3/42374 379/207.07 |
| 2013/0282844 A1* | 10/2013 | Logan | ..................... | H04L 67/02 709/206 |
| 2014/0222528 A1 | 8/2014 | Chang et al. | | |
| 2017/0324867 A1 | 11/2017 | Tamblyn et al. | | |

FOREIGN PATENT DOCUMENTS

WO 2016/210164 A1 12/2016
WO 2018/045154 A1 3/2018

OTHER PUBLICATIONS

Extended European Search Report issued in European Application No. EP19192195.6 dated Oct. 22, 2019, 7 pages.

* cited by examiner

*Primary Examiner* — Austin J Moreau
(74) *Attorney, Agent, or Firm* — Ziegler IP Law Gruop LLC

(57) ABSTRACT

A method for facilitating computer-generated communication with a user, the method including: receiving one or more inputs from the user during a first session; creating a profile of the user based on the received one or more inputs during the first session; determining if the first session is interrupted; and establishing a second session with the user, in case of the first session being interrupted, based on the profile of the user.

15 Claims, 2 Drawing Sheets

METHOD AND SYSTEM FOR FACILITATING COMPUTER-GENERATED COMMUNICATION WITH USER

TECHNICAL FIELD

The present disclosure relates generally to computer-generated communication with user; and more specifically, to methods for facilitating computer-generated communication with user. Furthermore, the present disclosure also relates to systems for facilitating computer-generated communication with user.

BACKGROUND

Typically, companies establish support centres, like telephone call centres, employing sales/customer service representatives for providing customer support to the consumers. A customer can call the support centre to speak with a customer service representative to enquire about a product or a service, and/or make a booking or reservation for a service and the like. However, the conventional technique of employing sales/customer service representatives to ensure customer satisfaction with the product or service have some drawbacks. One such drawback is that substantial amount of funds are needed by organizations to establish and operate telephone call centres, and particularly the substantial cost of human resources. Furthermore, to avoid call waiting for the customers increasing amount of sales/customer service representatives have to hired by the organizations which, in turn, increases the expenditure of the organizations. Online chat and instant messaging systems have been implemented to provide an alternative to telephone call centres that enables the sales/customer service representatives to handle multiple conversations ("chats") at any instant of time; however, this solution still remain fairly expensive.

Some organisations are employing chatbots and virtual assistants in place of human sales/customer service representatives for communication with a user. However, these virtual assistants face problems with comprehending human speech and generally fail to understand the customer request made during a session if the session gets terminated due to any reasons, such as due to connection error, misunderstanding, or running out of battery of user's device. The existing solutions resort to establish a fresh session with the customer, in which the customer may have to repeat the request all over again which can be tiresome and frustrating for the customer.

Therefore, in light of the foregoing discussion, there exists a need to overcome the aforementioned drawbacks associated with the conventional technique of providing customer services to ensure customer satisfaction.

SUMMARY

The present disclosure seeks to provide a method for facilitating computer-generated communication with a user.

The present disclosure also seeks to provide a system for facilitating computer-generated communication with a user.

The present disclosure seeks to provide a solution to the existing problem of providing conventional customer services by employing support representative and/or backend operator. An aim of the present disclosure is to provide a solution that overcomes at least partially the problems encountered in prior art, and provides system and method for facilitating computer-generated communication with a user to provide smart customer service.

In one aspect, an embodiment of the present disclosure provides a method for facilitating computer-generated communication with a user, the method comprising:
receiving one or more inputs from the user during a first session; creating a profile of the user based on the received one or more inputs during the first session;
determining if the first session is interrupted; and
establishing a second session with the user, in case of the first session being interrupted, based on the profile of the user.

In another aspect, an embodiment of the present disclosure provides a system for facilitating computer-generated communication with a user, the system comprising:
a user device associated with the user; and
a server arrangement communicably coupled to the user device, the server arrangement configured to:
  receive one or more inputs from the user, via the user device, during a first session;
  create a profile of the user based on the received one or more inputs during the first session;
  determine if the first session is interrupted; and
  establish a second session with the user, in case of the first session being interrupted, based on the profile of the user.

Embodiments of the present disclosure substantially eliminate or at least partially address the aforementioned problems in the prior art, and enables user to easily re-establish the communication with support representative and/or backend operator when the communication is interrupted, without repeating the communication before interruption.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
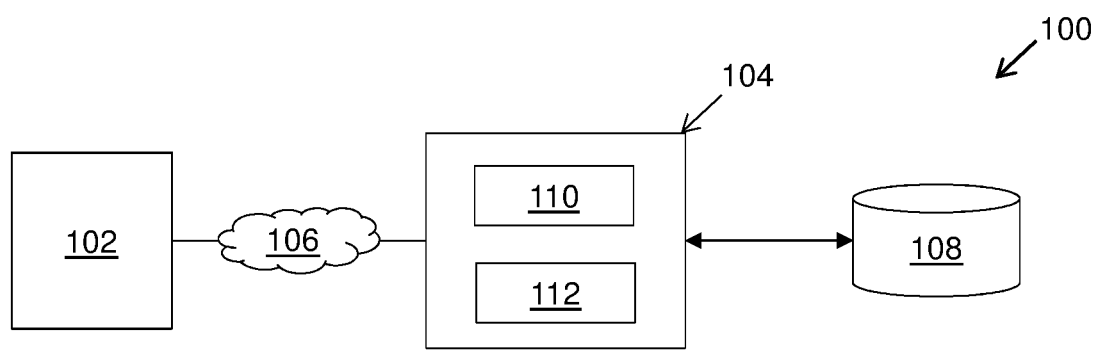
FIG. 1 is an illustration of a block diagram of a system for facilitating computer-generated communication with a user, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for facilitating computer-generated communication with a user, the method comprising:
receiving one or more inputs from the user during a first session;
creating a profile of the user based on the received one or more inputs during the first session;
determining if the first session is interrupted; and
establishing a second session with the user, in case of the first session being interrupted, based on the profile of the user.

In another aspect, an embodiment of the present disclosure provides a system for facilitating computer-generated communication with a user, the system comprising:
a user device associated with the user; and
a server arrangement communicably coupled to the user device, the server arrangement configured to:
  receive one or more inputs from the user, via the user device, during a first session;
  create a profile of the user based on the received one or more inputs during the first session;
  determine if the first session is interrupted; and
  establish a second session with the user, in case of the first session being interrupted, based on the profile of the user.

The present disclosure provides the aforementioned method, and the aforementioned system for facilitating computer-generated communication with the user. Beneficially, the method described herein allows intelligent communication between the user and a service provider that employs server arrangement implementing artificial intelligence and natural language processing algorithms to provide customer service and/or user assistance. Furthermore, the system is operable to re-establish the communication with the user, when the communication therewith is interrupted. Beneficially, such operation provides improved and efficient technique to provide customer service and/or user assistance. Furthermore, the present method provides a smoother customer support in which, in an event of disruption of a call, the user doesn't have to reinitiate the conversation to provide information that had been relayed in the interrupted call, thereby ensuring a better customer satisfaction for the user. Additionally, by refraining the user from repeating information that was relayed in the interrupted call, the method is operable to save time of the user and thus provide a user-friendly customer support service.

The present disclosure provides the method for facilitating computer-generated communication with the user. Specifically, the method is operable to provide interactive communication with the user. Furthermore, to provide interactive communication, the method comprises interpreting a message, namely a voice message or a text message from the user, and subsequently generating an appropriate message in response to the interpreted message. Furthermore, the method for facilitating computer-generated communication is implemented on a system that includes one or more communication devices. The communication devices include a user device associated with the user, and a server arrangement communicably coupled to the user device. Optionally, the one or more communication devices are configured to execute a computer program product for implementing the method. Furthermore, the computer program product is operable to provide natural language processing for facilitating computer-generated communication with the user.

The method comprises receiving one or more inputs from the user during a first session. Throughout the present disclosure, the term "first session" as used herein refers to any one-way or two-way communication to exchange information between two or more communication devices, namely the user device and the server arrangement, over a communication link. In an example, the first session may be a two-way communication for exchanging information related to a service request between the user device and the server arrangement. Optionally, the communication link to establish the first session can be a wired or wireless communication channel between the user device and the server arrangement. Examples of communication link may include Public Switched Telephone Network (PSTN), Internet Protocol (IP) network and the like. In operation, the first session can include receiving voice communication from the user, analysing the voice communication to determine a message in the received voice communication, and thereafter generating a computer-generated message to be communicated back to the user via the communication link in response to the received voice communication. Furthermore, the system involves the use of artificial intelligence algorithms and natural language processing algorithms (explained herein later) to analyse the voice communication from the user. It may be contemplated that the natural language processing involves conversion of the received voice communication from the user into textual content and the artificial intelligence algorithms may analyse the textual content for generating the computer-generated message in response to the received voice communication.

Furthermore, the one or more inputs from the user during the first session is received at the server arrangement. As discussed, the one or more inputs are provided by the user via the user device in communication with the server arrangement. Throughout the present disclosure, the term "user device" as used herein refers to an electronic device associated with (or used by) the user that enables the user to provide the one or more inputs during the first session. For example, the user device may include, but are not limited to, cell phones, smartphones, personal digital assistants (PDAs), tablet computers, laptop computers, personal computers, etc. In operation, the user device can be a portable telephone that enables user to make and receive calls over a radio frequency link while the user is moving within a telephone service area. In one or more examples, the user device may include a processor, a keypad, a memory, a network interface card, a display, microphone and so forth working in conjunction to allow the user to provide the one or more inputs.

Optionally, the one or more inputs provided by the user, via the user device, can be in the form of text, audio, video, multimedia communication or any other type of data communication to initiate and maintain the first session with the server arrangement. In an example, the user may use the user device, namely a cell phone to provide the input, namely an audio communication via the microphone included in the cell phone. In another example, the user may use the user device, namely a smart phone to record audio and/or sound signal, that can be further communicated as one or more inputs provided by the user via the user device. In an example, the user may use the user device, namely a tablet computer to provide the input, namely a text communication. In such example, the text communication may be a text message or request provided via a computer program product hosted in the tablet computer, namely an instant messenger application.

Optionally, the first session comprises a voice call. Throughout the present disclosure, the term "voice call" as used herein refers to a delivery of voice communications over the communication link that natively supports the first session. For example, the voice call may be a telephone call initiated from the user device, namely a smartphone, and received at the server arrangement. In such example, the telephone call may enable providing one or more inputs from the user device to the server arrangement. Furthermore, the voice call is implemented using various technologies, such as crosstalk, second-generation (2G) cellular technology, third-generation (3G) cellular technology, Long Term Evolution (LTE) cellular technology, Voice over Long-Term Evolution (VoLTE) cellular technology, and the like.

Optionally, the first session comprises a chat session. Throughout the present disclosure, the term "chat session" as used herein refers to any type of text based two-way communication, such as, instant text messaging, or the like. Specifically, the chat session is the text based two-way communication between the user device and the server arrangement. Additionally, the chat session can be conducted through a number of software products, such as sessions that are conducted by typing using a messenger such as Yahoo! Messenger®, Microsoft Messenger®, AOL Instant Messenger® or other programs operating in a similar manner. It will be appreciated that the software product enabling the chat session is hosted in the user device and the server arrangement. Optionally, the chat session can be initiated by the user via software products hosted in the user device. Subsequently, the server arrangement can host a software product to respond to the chat session initiated by the user. It will be appreciated that the software product hosted in the server arrangement and the user device are of same vendor and, usually, of same version.

Optionally, the system may be operable to process human languages comprising the voice call and/or the chat session initiated by the user from the user device. Furthermore, the system processes the human languages to comprehend statements uttered in the voice call and/or received in the chat session. The processing of the human languages is achieved by using natural language processing applications, that can be hosted in the server arrangement. Such applications include partial parsing, information retrieval, machine translation and the like, to comprehend the statements mentioned by the user during the voice call and/or the chat session. Furthermore, upon comprehending the statements in the voice call and/or the chat session an appropriate response for the statement mentioned can be identified and subsequently communicated to the user. It will be appreciated that the appropriate response is a predefined content/data that is stored in the server arrangement, or can be acquired by the server arrangement from any connected device, namely a database. Furthermore, the appropriate response is determined by one or more algorithms, namely the artificial intelligence algorithms, hosted therein. Additionally, the appropriate response can be in a variety of forms, including a textual input, a speech input, and the like.

Throughout the present disclosure, the term "server arrangement" as used herein relates to a computational entity configured to acquire, process and/or respond to the one or more inputs received from the user device. Optionally, the server arrangement includes one or more programmable and non-programmable components. Examples of the one or more programmable and non-programmable components may include memory, processor, network adapter, cabinets, crisscrossed wires, connector and the like. Moreover, the one or more programmable and non-programmable components of server arrangement are configured to host computer programs and/or routines that provide various services. In one example, the services may include providing connectivity between the server arrangement and the user device for establishing the first session and subsequently receiving one or more inputs from the user. In another example, the services may include providing a data repository service for storing the information related to the user. In yet another example, the services may include hosting natural language computer programs and/or routines for processing the one or more inputs received from the user.

Optionally, the server arrangement includes a device-functionality software and/or an operating system software configured to execute other programs/software application/artificial intelligence algorithms including various modules for storing and processing the one or more inputs provided by the user during the first session. Throughout the present disclosure, the term "artificial intelligence algorithm" as used herein relates to software-based algorithms that are executable on computing hardware and are operable to adapt and adjust their operating parameters in an adaptive manner depending upon information that is presented to the software-based algorithms when executed on the computing hardware.

Optionally, the algorithms involve a decision tree or network defining decision states concerning what to respond to the one or more inputs received from the user device, wherein weights are associated with the decision states which are based upon previous experiences derived from responding to the one or more inputs received from the user device or other similar types of communication devices of other users. Optionally, the experiences are aggregated across a plurality of user devices, as will be described in greater detail below.

The algorithms are operable to migrate between the decision states depending upon one or more inputs presented to the algorithms, in operation. Moreover, the algorithms are operable to generate new decision states for new types of inputs that have not previously been provided to the algorithms, as detected using a matching function of the algorithms that compares a given type of input with another type of input. The matching function is optionally based upon a neural network that is trained against various types of inputs to differentiate between the different types of inputs. For performing such a comparison of inputs, the inputs are processed to generate metadata, or pseudo-metadata, wherein the matching function is operable to determine a "distance" between the contents being compared, based at least in part upon the metadata or pseudo-metadata. Pseudo-metadata is, for example, a combination of metadata parameters and a portion of the content being compared; for example, the metadata may define that the input relates to a category of request whereas a portion of the input may relate to a type or outline of a request included in the input.

Optionally, the algorithms are operable to analyse the one or more inputs provided by the users to identify key terms in the one or more inputs, and subsequently generate the response. The algorithms may be operable to analyse the one or more inputs, and determine category of the one or more inputs. In an example, the one or more inputs may be provided by the user in a voice call. In such example, the algorithms may be operable to identify words uttered by the user during the voice call to determine a request category of the one or more inputs. In such example, the algorithms may be operable to provide a computer-generated response, namely a voice response, to the request included in the one or more inputs. In another example, the one or more inputs may be provided by the user in a chat session. In such example, the algorithms may be operable to analyse the one or more inputs, and determine category of the one or more inputs. Further, the algorithms may be operable to identify text mentioned by the user during the chat session to determine a request category of the one or more inputs. Furthermore, the algorithms may be operable to provide a computer-generated response, namely a text response, to the request included in the one or more inputs.

The algorithm is operable to comprehend the communication of the user in any language and/or dialect in each of voice call or chat session. In an example, the user can communicate with the server arrangement in any one of English language, Finnish language, German Language, Hindi language, Chinese language, Spanish language and so forth. Furthermore, the user can communicate with the server arrangement in any one of Indian English accent, Chinese English accent, German English accent and so forth. In some examples, the user can communicate with the server arrangement in a combination of two or more languages and/or dialects without any limitations. For example, the user can communicate with the server arrangement in a combination of, for instance, English language and German language. It will be appreciated that, the server arrangement uses the natural language processing applications hosted therein to comprehend the communication of the user in various languages, accents and/or dialects in each of the voice call or the chat session.

In operation, the algorithms identify keywords in the one or more inputs, namely the voice call and/or the chat session, provided by the user. Subsequently, based on the identified keywords the algorithms comprehend the motive of the voice call and/or the chat session, and create computer-generated response. For example, in a voice call and/or the chat session of a user "U" such as "Book me a cab from location F to location G", the algorithms may identify keywords such as "book", "cab", "location F", and "location G". In such example, the algorithms may comprehend that user "U" is requesting to book a cab from "location F" to "location G". In such example, the algorithms may create the computer-generated responses, such as "Booking a cab for U from location F to location G", "Cab, registration number XXX-CCC-VVV has been booked for U" and "Cab will reach the pick-up location in 10 minutes". It may be contemplated that the algorithms may use some backend applications and framework having information about, for example, available cabs, available cabs near location F, etc. for generating the response.

The method comprises creating a profile of the user based on the received one or more inputs during the first session. Specifically, the computer programs and/or routines hosted in the server arrangement are operable to generate the profile of the user based on the received one or more inputs during the first session. Throughout the present disclosure, the term "profile" as used herein relates to a collection of information that is operable to indicate attributes and/or interests of the associated user, regardless of the manner in which it is collected. The profile associated to the user can include login details, demographical details, connectivity details, financial details, career details, health details, personal preference details and the like. In an example, the login details of the user may include user name of the user, password of the user, email address of the user and the like; the demographical details of the user may include date of birth, age, gender, address, location, no. of family members, religion, citizenship, and the like; the connectivity details of the user may include name of the vendor of which the user uses a phone number, number of calls and messages made by the user, and the like; the financial details of the user may include bank account number, the vendor details of which the user uses the banking services, debit or credit card number and the like; the career details associated to the user may include job designation, total amount of experience, current salary, and the like; the health details associated to the user may include weight, height, body mass index, major disorders, and the like; the personal preference details of the user may include holiday preferences, hotel preferences, food preferences, movie preference, book preference, and the like.

Optionally, the profile of the user comprises information about a voice fingerprint of the user in the voice call. Optionally, the voice fingerprint of the user during the voice call of the first session is determined by the computer programs and/or routines hosted in the server arrangement. Throughout the present disclosure, the term "voice fingerprint" as used herein relates to a voice sample including voice features extracted from a word or phrase uttered by the user during the voice call of the first session. In operation, the voice call of the first session initiated via the user device whilst providing the one or more inputs is received at the server arrangement. Subsequently, the word or phrase uttered by the user during the voice call is converted into a corresponding digital data format (such as a string of numbers) using a programmable component (namely, an analog-to-digital converter) of the server arrangement. Thereafter, the corresponding digital data is converted into a graph using mathematical techniques. In an example, the corresponding digital data may be converted into a spectrogram using Fast Fourier Transform. Furthermore, the graph is operable to display change in intensity of component frequencies of sound of the user whilst uttering the words or phrase over time. Thereafter, the graph is classified into a series of overlapping chunks for specific time frames. In an example, the graph is classified into a series of acoustic frames, each one typically lasting $\frac{1}{25}$ to $\frac{1}{50}$ of a second. Subsequently, the series of overlapping chunks are categorized into a voice fingerprint for the user and stored into a repository for future processing, such as for preforming speech recognition to identify user. Optionally, the voice fingerprint for the user is stored along with the attributes and/or interests associated to the user.

Optionally, the server arrangement can request the user to utter specific word or phrase during the voice call of the first session for determining the voice fingerprint of the user. In an example, after the voice call of the first session is initiated by the user and received at the server arrangement, a pre-recorded message including specific word or phrase may be provided to the user. In such example, the user may utter the specific word or phrase during the voice call to enable the server arrangement to determine the voice fingerprint of the user.

Optionally, the profile of the user comprises information about a phone number of the user utilized for making the voice call. Throughout the present disclosure, the term "phone number" as used herein relates to a number of any circuit-switched network that corresponds to the user device and communication link that natively supports the first session. Optionally, the computer programs and/or routines hosted in the server arrangement are operable to determine the phone number of the user utilized for making the voice call. Alternatively, the computer programs and/or routines can be configured to generate pre-recorded message for requesting the user to verbally mention or type-in the phone number during the voice call of the first session. Optionally, the phone number utilized for making the voice call is stored along with other information, including the attributes, the interests and/or the voice fingerprint associated with the user.

Optionally, the profile of the user comprises information about account details of the user utilized for authenticating the chat session. Throughout the present disclosure, the term "account details" as used herein relates to data associated to the user that comprises the profile of the user. Optionally, the account details are provided by the user via the user device. Furthermore, the account details provided by the user are stored by the server arrangement in a manner to form the profile for the user. Optionally, the computer programs and/or routines hosted in the server arrangement is configured to request one or more details from the user at the initiation of the chat session, and thereafter compare the provided details with the account details of the user stored in the sever arrangement. In an exemplary event wherein, the user initiates a chat session with the server arrangement for requesting a service, the algorithms hosted in the server arrangement is configured to authenticate the chat session. In one example, the algorithms are configured to request the user to provide account details thereof. The account details of the user used to authenticate the chat session may include the username, password, email address, date of birth, phone number and the like. It may be contemplated the algorithms are configured to compare the account details provided by the user to authenticate the chat session.

Optionally, the account details of the user can be utilized for authenticating the voice call. In an exemplary event wherein, the user initiates a voice call with the server arrangement for requesting a service, the algorithms hosted in the server arrangement is configured to authenticate the voice call using the account details. In such example, the algorithms may be configured to identify keywords in the statements of the user mentioned in the voice call to identify the account details. In such example, the user may mention a statement during the voice call such as "My username is XYZ and my phone number is AAA-DDDDDDD". In such example, the algorithm is operable to identify the keywords such as "username", "XYZ", "phone number" and "AAA-DDDDDDD". Subsequently in such example, the algorithm is configured to compare the keywords with the stored account details of the user to authenticate the voice call.

Optionally, the profile of the user comprises information about progress of a target activity for the user, the target activity being defined based on the received one or more inputs from the user. Throughout the present disclosure, the term "target activity" as used herein refers to any request communicated by the user via the user device to the server arrangement. The target activity is defined based on the one or more inputs entered by the user via the user device, and subsequently communicated to the server arrangement. Furthermore, the one or more inputs received by the server arrangement can be recorded by the computer programs and/or routines (hosted therein) as a target activity associated to the user. In an example, the one or more inputs provided by the user may include a request for booking a hotel room in a hotel 'A' from a day 'X' to a day 'Y'. In such example, the computer programs and/or routines hosted in the server arrangement are operable to store such inputs as a target activity 'I' of booking the hotel room.

Optionally, the target activity for the user includes one or more status, wherein the one or more status of the target activity describes the current progress of the target activity. Optionally, the one or more status can be initiated, in-progress and completed. In an example, wherein the status "initiated" is assigned to the target activity, computer programs and/or routines may be operable to determine that the target activity has started. Furthermore, in such example, wherein the status "in-progress" is assigned to the target activity, the computer programs and/or routines are operable to determine that the target activity is being processed, i.e. the request included in the target activity is being managed. Furthermore, in such example, wherein the status "completed" is assigned to the target activity, the computer programs and/or routines are operable to determine that the target activity is processed.

Furthermore, the computer programs and/or routines hosted in the server arrangement are operable to determine the progress of the target activity based on the status of the target activity. In an example, a voice call initiated by the user may include a statement such as "Book me a taxi from". In such event, the algorithm hosted therein may be operable to identify the keywords in the voice call such as "book", "taxi", "from". In such instance, the algorithm hosted therein is operable to identify motive of the target activity to be booking a taxi. Additionally, the algorithm may be operable to determine that the status of the target activity to be initiated, i.e. the target activity of booking the taxi has started. Furthermore, the algorithm may be operable to comprehend that the statement included in the voice call doesn't include appropriate information for booking a taxi. In such event the algorithm may be operable to determine that the status of the target activity to be in-progress, i.e. the target activity of booking the taxi has started however the target activity has not been achieved yet.

In another example, a chat session initiated by the user may include a statement such as "Book me a single room in hotel A form a day X to a day Y". In such event, the algorithm hosted therein may be operable to identify the keywords in the voice call such as "book", "single room", "hotel A", "from", "day X", "day Y". In such instance, the algorithm hosted therein is operable to identify motive of the target activity to be booking in a room hotel A. Additionally, the algorithm may be operable to determine that the status of the target activity to be initiated, i.e. the target activity of booking the room in the hotel A has started. Furthermore, the algorithm may be operable to provide the user with a web-link for making the payments to book the single room in the hotel A form the day X to day Y. In such event the algorithm may be operable to determine that the status of the target activity to be in-progress, i.e. the target activity of booking the room has started however the target activity has not been achieved yet. Subsequently, after a payment confirmation is received at the user device, the algorithm may be operable to determine that the status of the target activity to be completed, i.e. the motive of target activity, namely booking the single room in hotel A form the day X to day Y has been achieved.

Optionally, the computer programs and/or routines hosted in the server arrangement are operable to store the target activity in correspondence to the attributes, the interests, the voice fingerprint and/or the account details associated to the user.

Optionally, a database is communicably coupled with the server arrangement and configured to temporarily store the created profile of the user, wherein the server arrangement is configured to delete the stored profile of the user, from the database, on occurrence of a predetermined event. Throughout the present disclosure, the term "database" as used herein refers to an organized body of digital information regardless of the manner in which the data or the organized body thereof is represented. Examples of the organized body may include a table, a map, a grid, a packet, a datagram, a file, a document, a list or any other form. Optionally, the database may be hardware, software, firmware and/or any combination thereof. For example, the database may include any data storage software and systems, such as, for example, a relational database like IBM DB2 and Oracle 9. Additionally, the database is populated by data elements. The data elements including data records, bits of data, cells are used interchangeably herein and represent information stored in cells of a database. Furthermore, the data records can include, but are not limited to, the account details, the phone number, the voice finger print, one or more inputs during the first session (such as request for a service) associated to the user. It will be appreciated that, the data elements associated to a given user populates the database in a specific section that is assigned to the given user.

Furthermore, the database is communicably coupled with the server arrangement to exchange information related to the user. Optionally, the database is configured to exchange information via a data network. Examples of the data network may include, but is not limited to, one or more peer-to-peer network, a hybrid peer-to-peer network, local area networks (LANs), radio access networks (RANs), wide area networks (WANs), portions of a public network such as the Internet, a cellular network and the like. Optionally, the database and the server arrangement are operable to exchange information related to the user carried out via any number of known protocols suitable for exchanging information including voice, video, data and combinations thereof. Examples of the protocols may include, but not limited to, Internet Protocol (IP), Wireless Access Protocol (WAP), Frame Relay, or Asynchronous Transfer Mode (ATM). Alternatively, the database can be implemented as a database management system hosted within the server arrangement. Furthermore, the database management system refers to the software program for creating and managing one or more databases. Optionally, the database may be operable to support relational operations, regardless of whether it enforces strict adherence to the relational model.

Optionally, the database is configured to temporarily store the created profile of the user. Specifically, the data elements, namely the account details, the phone number, the voice finger print, and the one or more inputs during the first session associated to the user are deleted from the database after a predefined period of time. The server arrangement is configured to instruct the database to delete the data elements stored therein. Generally, the created profile is deleted in compliance with any jurisdictional regulations related to storage of private data of the user. Optionally, the method further comprises deleting the created profile of the user on occurrence of a predetermined event. Specifically, the server arrangement is configured to delete the stored profile of the user, from the database, on occurrence of a predetermined event. Optionally, the computer programs and/or routines is configured to delete the profile of the user upon determining the occurrence of a predetermined event. Optionally, the predetermined event is expiration of a specified amount of time post the interruption of the first session. For example, the predetermined event may include execution of an instruction after 10 minutes of the interruption of the first session. In such example, the instruction may be recorded in the computer programs and/or routines hosted by the server arrangement. Furthermore, in such example, the instruction may include initiating a second session with the user, or the deletion of the profile of the user stored in the database. Optionally, the specified amount of time after the interruption of the first session can be preprogramed into the computer programs and/or routines hosted by the server arrangement.

Optionally, the predetermined event is indication of completion of the target activity for the user. Optionally, the predetermined event may include one or more instructions recorded in the computer programs and/or routines hosted by the server arrangement. Furthermore, the instructions may include identifying the status of the target activity for the user. For example, a target activity may be booking a cab for a user. In such example, the occurrence of predetermined event may indicate that the target activity has been achieved, i.e. the cab had been booked.

The method comprises determining if the first session is interrupted. Specifically, the server arrangement communicably coupled to the user device is configured to determine if the first session is interrupted. Optionally, the computer program and/or routines hosted by the server arrangement is operable to determine if the first session between the server arrangement and the user device is interrupted. Specifically, interruption relates to disruption of the one-way or two-way communication between the user device and the server arrangement over the communication link. In an example, interruption of the first session may be disruption of a voice call natively supporting the exchange of information between the server arrangement and the user device. It may be understood that the first session can be interrupted due to plurality of factors. Examples of the plurality of factors interrupting the first session may include disruption of the communication link, malfunction of the user device or the server arrangement, and the like. In such example, the malfunctioning of the user device or the server arrangement can comprise discharging of the user device, fault in software of the user device, virus attacks on the user device.

Optionally, the artificial intelligence algorithms executed by the server arrangement is operable to identify an interruption in the first session. Specifically, the artificial intelligence algorithms are operable to analyse the one or more inputs during the voice call or the chat session of the first session, and subsequently identify interruption in the first session. For example, the artificial intelligence algorithms may be configured to analyse the voice call to identify the incomplete sentences (such as "and I want a", "also please include") of the user on the voice call. In such event the artificial intelligence algorithms are configured to determine that communication in the first session is interrupted. In another example, the artificial intelligence algorithms may be configured to analyse the text in the chat session to identify the incomplete chat text (such as "and I want a", "also please include") of the user on the chat session. In such event the artificial intelligence algorithms is configured to determine that communication in the first session is interrupted.

The method comprises establishing a second session with the user, in case of the first session being interrupted, based on the profile of the user. Specifically, the server arrangement is configured to establish a second session with the user, in case of the first session being interrupted. In operation, the artificial intelligence algorithms executed by the server arrangement is operable to identify if the first session is interrupted, and thereafter, initiate the second session with the user. In an example, a voice call of a first session initiated by the user may include a statement such as "Book me a taxi from". In such event, the algorithm hosted therein may be operable to identify the keywords in the voice call such as "book", "taxi", "from". Additionally, the algorithm may be operable to comprehend that the statement included in the voice call doesn't include appropriate information for booking a taxi. In such event, the algorithm may be operable to determine that the status of the target activity to be in-progress and the session has been interrupted. In such instance, the algorithm may be operable to establishing a second session with the user to acquire the appropriate information for booking the taxi, such as pick-up location, pick-up time, drop location, and the like. Subsequently, the algorithm may be operable to book the taxi for the user upon receiving the request information from the user.

Optionally, the second session is similar to the first session, i.e. the second session refers to any one-way or two-way communication to exchange information between two or more communication devices, namely the user device and the server arrangement, over a communication link for a defined start and end time. In an example, when the first session was a voice call, then the second session is, preferably, also a voice call. In another example, when the first session was a chat session, then the second session is, preferably, also a chat session. Optionally, the second session can be dissimilar to the first session. In an example, the second session can be a voice call while the first session may have been a chat session. In another example, the second session can be a chat session while the first session may have been a voice call.

Optionally, the second session is established in case of no indication of the target activity being completed within a first predefined period of time post the interruption of the first session. The first predefined period of time refers to a specific time frame within which the artificial intelligence algorithms executed by the server arrangement, is operable to analyse the status of the target activity. For example, the first predefined period of time may be 5 minutes post the interruption of the first session. Optionally, in the event wherein status for the target activity associated with the user recorded in the corresponding profile is not being described as completed, the artificial intelligence algorithms are configured to establish the second session. In an example, the target activity recorded before the interruption of the first session may be booking a cab for the user "B" positioned at a location "J" to travel to a location "K". In such example, the artificial intelligence algorithms may determine that the location of the user "B" has not changed from "J" after 5 minutes of the interruption of the first session. In such case, the system may track the user's location from the app used to make the service request by utilizing location service, like Global Positioning System (GPS), in the user's device. Subsequently, in such example, artificial intelligence algorithms may establish the second session in the form of a voice call or a chat session to inquire if the cab has arrived at the location "J" for boarding. In other case, if the user has moved towards from the location "J" towards the location "K" by at least a distance "C", like 1 Km, then the target activity may be marked as "completed".

Optionally, the second session is established after a second predefined period of time post the interruption of the first session. The second predefined period of time refers to fixed period of time for establishing the second session after the first session is interrupted. In an example, the first session may be interrupted at 5:00 PM. In such example, the artificial intelligence algorithms may be configured to establish the second session after a fixed time duration (second predefined period of time) of 5 minutes, i.e. at 5:05 PM. Alternatively, the second predefined period of time can occur post the first predefined period of time. In an example, the first session may be interrupted at 5:00 PM, and the first predefined period of time post the interruption of the first session may of 5 minutes, i.e. up to at 5:05 PM. In such example, the second predefined period of time may be of 10 minutes. Therefore, in such example, the artificial intelligence algorithms may be configured to establish the second session at 5:15 PM In an exemplary implementation of the present invention, the user starts a first session with the server arrangement of a taxi ordering service. The first session may comprise one or more sub-sessions which include the flow of dialogue between the user and the server arrangement. The first sub-session includes dialogue of the user—"Hello", the corresponding second sub-session includes dialogue from the server arrangement—"Hello". The third sub-session includes dialogue of the user—"I would like to have a taxi to railway station", the corresponding fourth sub-session includes dialogue from the server arrangement—"Ok. How many persons?". Upon such dialogue, the server arrangement doesn't receive any response for the user. Thereafter, the server arrangement is operable to consider that the first session has been interrupted. Furthermore, the dialogues of the first session are stored in a database as a profile of the user. The profile comprises user's phone number such as 040123456, target of the call being hiring a taxi. Subsequently, the server arrangement is operable to initiate a second session after a first predefined period of time post the interruption of the first session. The second session also includes one or more sub-sessions which include the flow of dialogue between the user and the server arrangement. The first sub-session of the second session includes dialogue for the user that may be consecutive to latest dialogue mentioned by the user, such as "How many persons is the booking for?". The second sub-session includes dialogue of the user—"We are two with lots of luggage", the corresponding third sub-session includes dialogue from the server arrangement—"Thanks for info the car is coming". Further, the dialogues of the first and the second session are stored in a database as a profile of the user. The profile comprises user's phone number such as 040123456, target of the call: taxi to railway station, triggering criteria to delete the profile of user: if user moves away from current location towards the railway station, triggering threshold: wait 5 minutes before making a call to user to inform the situation, and language: English. Further, if the user moves within 5 minutes then the profile of the user is deleted, and if the user does not move within 5 minutes the server arrangement calls number 040123456 and speaks in English to convey the user a dialogue: "Taxi is on its way sorry about the delay".

DETAILED DESCRIPTION OF THE DRAWINGS

Referring to FIG. 1, there is provided an illustration of a block diagram of a system 100 for facilitating computer-generated communication with a user, in accordance with an embodiment of the present disclosure. The system 100 comprises the user device 102 associated with the user (not shown) and a server arrangement 104 in communication with the user device 102 via a communication link 106. The system 100 also comprises a database 108 in communication with the server arrangement 104 to store information received in the server arrangement 104 from the user device 102. The server arrangement 104 comprises a processor 110 to execute one or more modules 112 for executing algorithms, including artificial intelligence based algorithms for analysing the information received in the server arrangement 104 from the user device 102 and natural language processing based algorithms for comprehending the information received in the server arrangement 104 from the user device 102, to derive one or more inputs therefrom.

Figure 2:
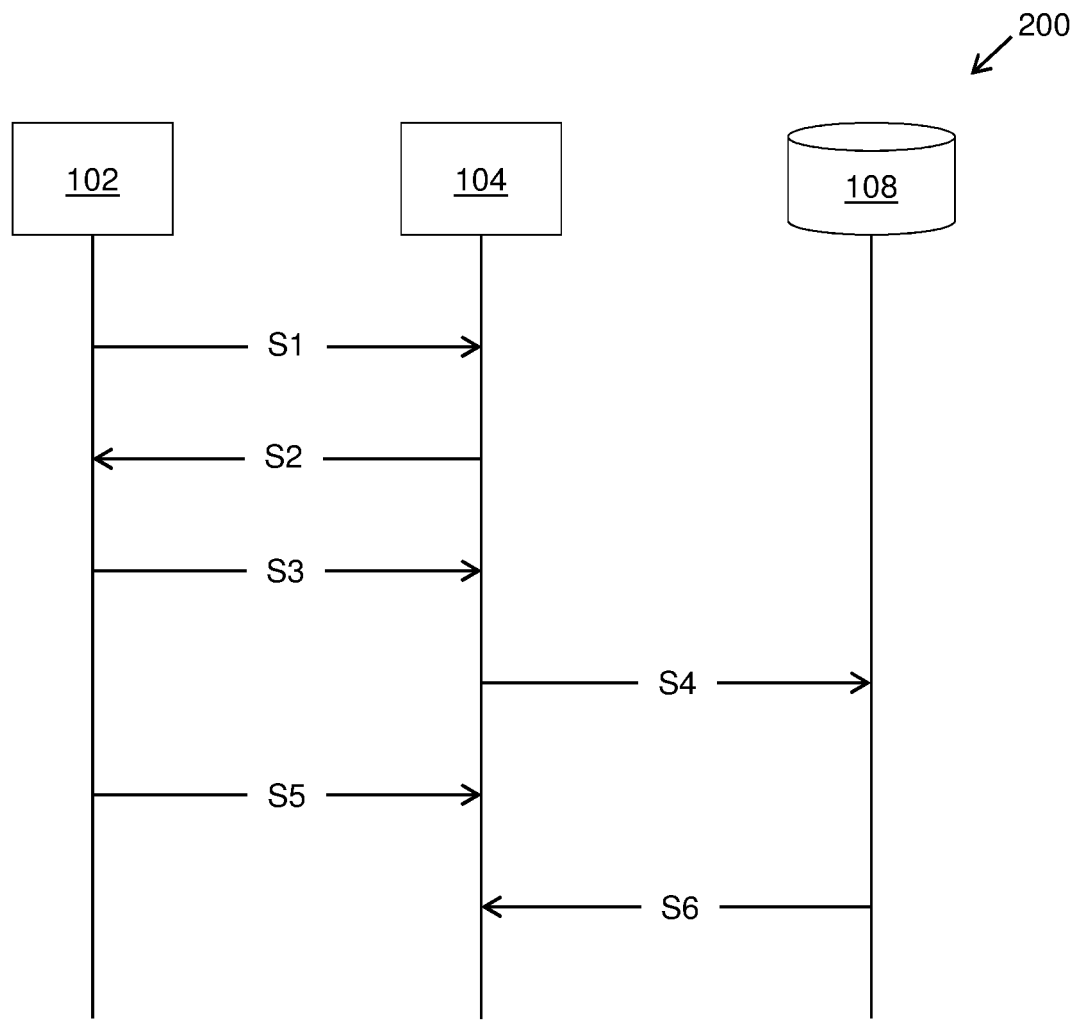
FIG. 2 is an exemplary sequence diagram of implementation of a system for facilitating computer-generated communication with a user, in accordance with an embodiment of the present disclosure.

Referring to FIG. 2, there is provided an exemplary sequence diagram 200 of implementation of a system (for example, such as the system 100 of FIG. 1), in accordance with an embodiment of the present disclosure. At steps S1, S2, and S3, dialogues between the user device 102 and server arrangement 104 are established during a first session. At step S4, the first session between the user device 102 and server arrangement 104 is interrupted, thereby a profile of user is stored corresponding to the first session in a database 108. At steps S5 and S6, dialogues between the user device 102 and server arrangement 104 are established during a second session if the first session is interrupted.

Figure 3:
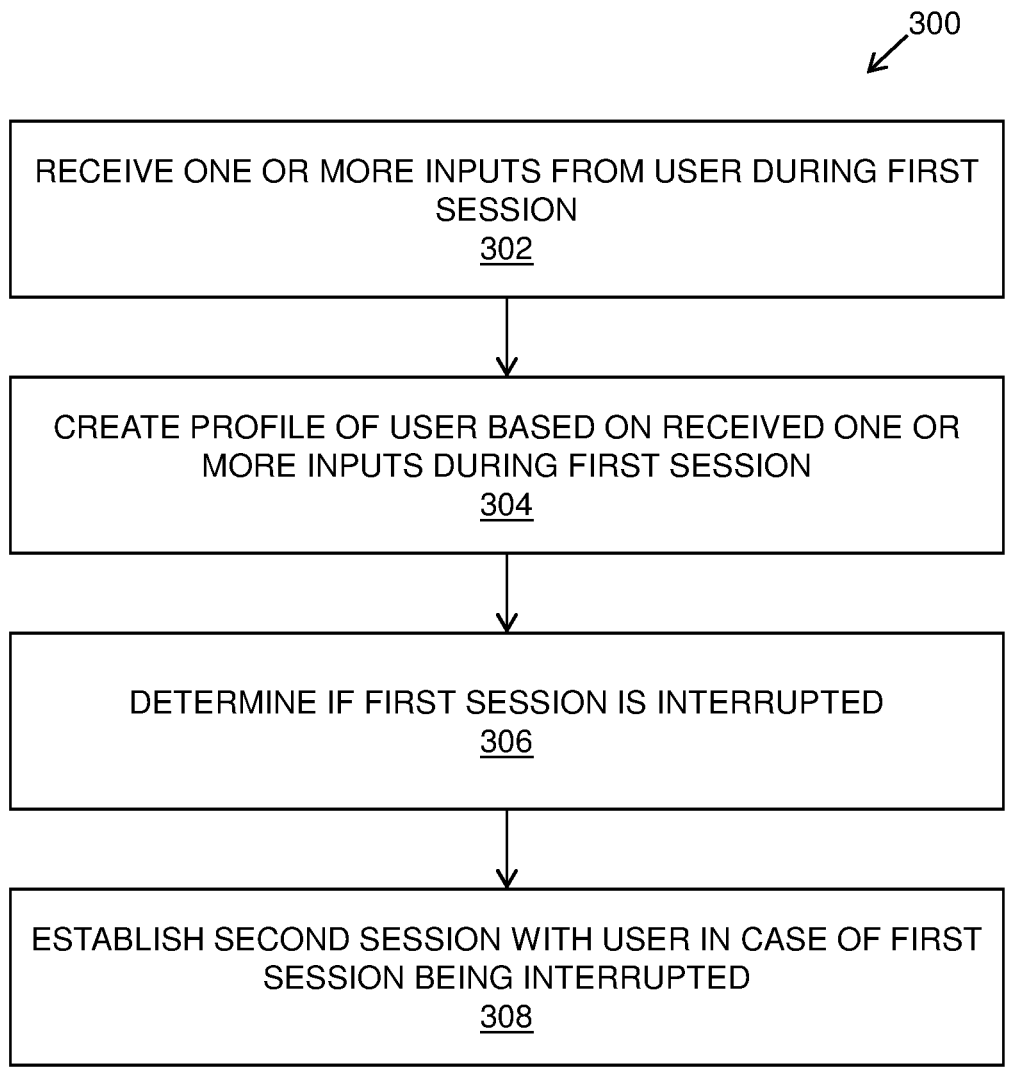
FIG. 3 is an illustration of steps of a method for facilitating computer-generated communication with a user, in accordance with an embodiment of the present disclosure.

Referring to FIG. 3, there are illustrated therein steps of a method 300 for facilitating computer-generated communication with a user, in accordance with an embodiment of the present disclosure. At a step 302, one or more inputs from the user are received during a first session. At a step 304, a profile of the user is created based on the one or more received inputs during the first session. At a step 306, the first session is determined if the first session is interrupted. At a step 308, a second session is established with the user, in case of the first session being interrupted, based on the profile of the user.

The steps 302 to 308 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for facilitating computer-generated communication with a user, the method comprising:
receiving one or more inputs from the user during a first session;
identifying a target activity of the user based on the received one or more inputs from the user;
creating a profile of the user based on the received one or more inputs during the first session, wherein the profile of the user comprises status information about progress of the target activity for the user;
determining if the first session is interrupted;
analyzing the status information of the target activity for the user subsequent to determining that the first session has been interrupted;
determining if a first predefined period of time post the interruption of the first session has elapsed;
in the event that the status information of the target activity for the user is determined to be incomplete after the first predefined period of time has elapsed, establishing a second session with the user; and
in the event that the status information of the target activity for the user is determined to have been completed within the first predefined period of time, marking the status information as completed.

2. A method according to claim 1, wherein the profile of the user comprises information about progress of a target activity for the user, the target activity being defined based on the received one or more inputs from the user.

3. A method according to claim 2, wherein the second session is established in case of no indication of the target activity being completed within a first predefined period of time post the interruption of the first session.

4. A method according to claim 1, wherein the second session is established after a second predefined period of time post the interruption of the first session.

5. A method according to claim 1 further comprising deleting the created profile of the user on occurrence of a predetermined event.

6. A method according to claim 5, wherein the predetermined event is indication of completion of the target activity for the user.

7. A method according to claim 5, wherein the predetermined event is expiration of a specified amount of time post the interruption of the first session.

8. A method according to claim 1, wherein the first session comprises a voice call, and wherein the profile of the user comprises information about a voice fingerprint of the user in the voice call.

9. A method according to claim 1, wherein the first session comprises a voice call, and wherein the profile of the user comprises information about a phone number of the user utilized for making the voice call.

10. A method according to claim 1, wherein the first session comprises a chat session, and wherein the profile of the user comprises information about account details of the user utilized for authenticating the chat session.

11. A system for facilitating computer-generated communication with a user, the system comprising:
a user device associated with the user; and
a server arrangement communicably coupled to the user device, the server arrangement configured to:
receive one or more inputs from the user, via the user device, during a first session;
identify a target activity of the user based on the received one or more inputs from the user;
create a profile of the user based on the received one or more inputs during the first session, wherein the profile of the user comprises status information about progress of the target activity for the user;
determine if the first session is interrupted;
analyze the status information of the target activity for the user subsequent to determining that the first session has been interrupted;
determine if a first predefined period of time post the interruption of the first session has elapsed;
in the event that the status information of the target activity for the user is determined to be incomplete after the first predefined period of time has elapsed, establishing a second session with the user; and in the event that the status information of the target activity for the user is determined to have been completed within the first predefined period of time, marking the status information as completed.

12. A system according to claim 11, wherein the server arrangement is further configured to monitor progress of a target activity for the user, the target activity being defined based on the received one or more inputs from the user, and wherein the second session is established in case of no indication of the target activity being completed within a first predefined period of time post the interruption of the first session.

13. A system according to claim 11, wherein the second session is established after a second predefined period of time post the interruption of the first session.

14. A system according to claim 11 further comprising a database communicably coupled with the server arrangement and configured to temporarily store the created profile of the user, wherein the server arrangement is configured to delete the stored profile of the user, from the database, on occurrence of a predetermined event.

15. A system according to claim 14, wherein the predetermined event is expiration of a specified amount of time post the interruption of the first session.

* * * * *